Dec. 29, 1925.

G. C. RAY ET AL 1,567,188

DIRECTION INDICATOR FOR MOTOR VEHICLES

Filed Nov. 17, 1924

INVENTORS
Goldburn C. Ray
Louis W. Terrill,
BY
Geo. T. Kimmel.
ATTORNEY.

Patented Dec. 29, 1925.

1,567,188

UNITED STATES PATENT OFFICE.

GOLDBURN C. RAY AND LOUIS W. TERRILL, OF CRIPPLE CREEK, COLORADO.

DIRECTION INDICATOR FOR MOTOR VEHICLES.

Application filed November 17, 1924. Serial No. 750,407.

*To all whom it may concern:*

Be it known that we, GOLDBURN C. RAY and LOUIS W. TERRILL, citizens of the United States, residing at Cripple Creek, in the county of Teller and State of Colorado, have invented certain new and useful Improvements in Direction Indicators for Motor Vehicles, of which the following is a specification.

This invention relates to a direction indicator for motor vehicles, and has for its object to provide, in a manner as hereinafter set forth, an indicator of the class referred to, capable of being conveniently operated by the driver of and from within a vehicle, if the latter is of the closed car type or of the open type when the curtains thereof are up, for indicating to the driver of an oncoming vehicle or a vehicle approaching from the rear the direction of travel in which the vehicle is to proceed.

A further object of the invention is to provide, in a manner as hereinafter set forth, a direction indicator for motor vehicles, capable of performing its signalling or direction indicating function not only during the day but also at night.

Further objects of the invention are to provide, in a manner as hereinafter set forth, a direction indicator for motor vehicles, which is simple in its construction and arrangement, strong, durable, compact, thoroughly efficient and convenient in its use, readily installed with respect to the motor vehicle body, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claim hereunto appended.

In the drawings wherein like reference characters denote corresponding parts throughout the several views:—

Figure 1:
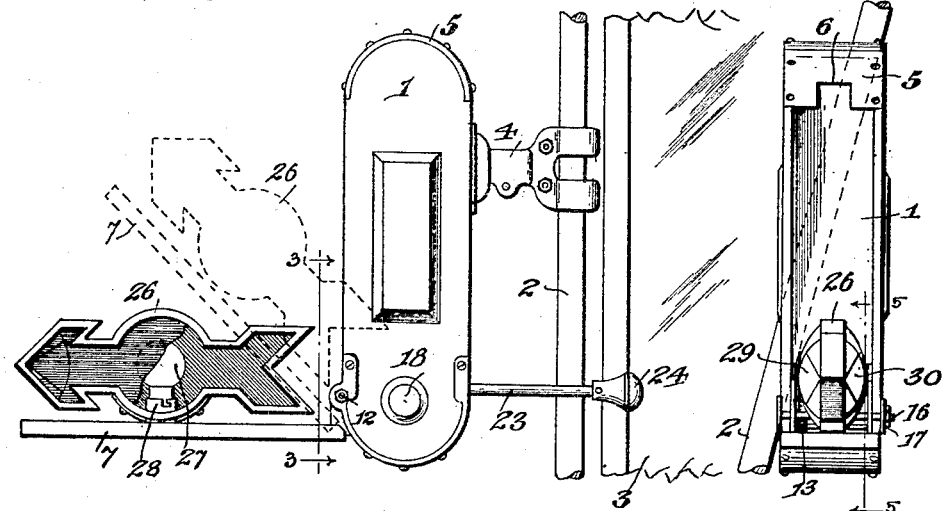
Figure 1 is a front elevation of a direction indicator in accordance with this invention, showing the adaptation thereof in connection with a motor vehicle, and further illustrating the signal arm in two signalling positions, one in full lines and the other in dotted lines.
Figure 2:
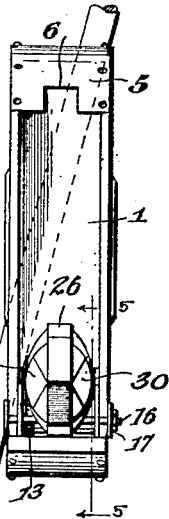
Figure 2 is a side elevation of the device illustrating the signal arm in signalling position.
Figure 3:
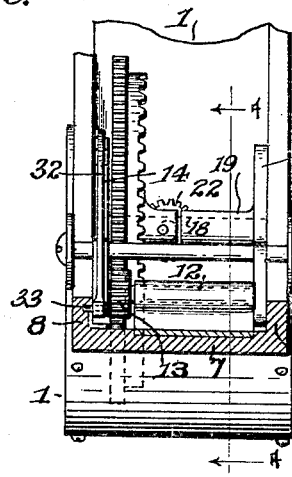
Figure 4:
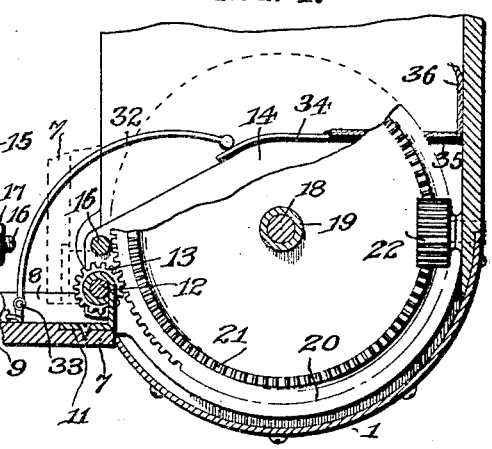
Figure 5:
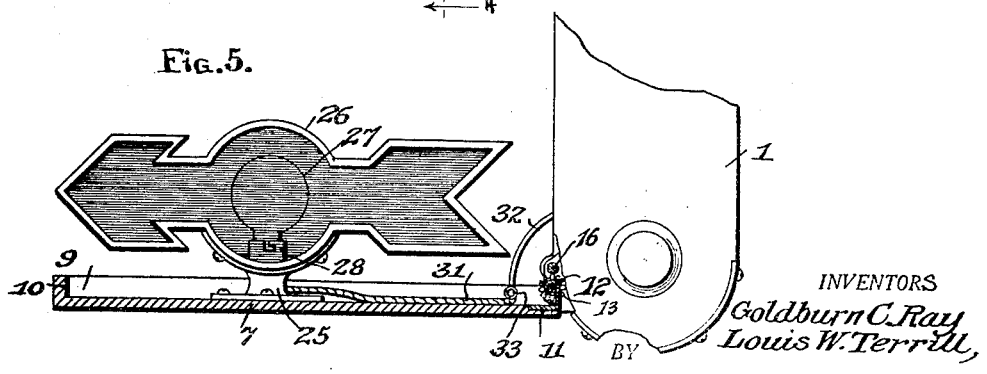

Figure 3 is a section on line 3—3, Figure 1.
Figure 4 is a section on line 4—4, Figure 3.
Figure 5 is a fragmentary view, in section, of the device and with the signalling arm in signalling position.

Referring to the drawings in detail, 1 denotes a vertically disposed casing which is secured to the side 2 of the vehicle, in proximity to the wind shield 3, by a combined clamp and suspension bracket 4. The casing 1 is positioned laterally with respect to the vehicle and spaced a substantial distance therefrom. The casing 1 is closed at its top, bottom, front, rear and inner side, and the combined clamp and suspension bracket 4 is fixedly secured to the inner side of the casing near the top thereof. The top and bottom of the casing 1 are semi-circular in contour and the outer side of the top 5 of the casing 1 is cut away, as at 6, to provide a clearance for a purpose to be presently referred to.

The open outer side of the casing 1 is normally closed by a shiftable signal arm support 7, which is of rectangular contour and formed on its inner face with longitudinal flanges 8, 9 and a horizontal flange 10. The flanges 8 and 9 are flush with the longitudinal edges of the support 7 and the flange 10 is flush with the outer end edge of said support. The flanges extend into the casing when the support 7 is in normal position.

Secured to the rear end of the support 7 is an angle-shaped coupling member 11, which is fixedly secured to a shaft 12 provided with a pinion 13. The shaft 12 is journaled in a pair of vertically disposed plates 14, 15. which are arranged within the casing 1 and project forwardly therefrom. A tie bolt 16, in connection with a nut 17, provides means for securing the plates 14 and 15 to the casing 1. The bolt 16 extends through the lower portion of the front and rear of the casing 1.

The coupling member 11 and shaft 12 provide a hinged connnection between the casing 1 and the support 7, and when the shaft 12 is actuated in a manner as hereinafter referred to, the support 7 is shifted to and from extended position with respect to the casing 1.

The plates 14 and 15 are furthermore secured to the casing 1, by a tie bar 18, which is anchored in the front and rear of the casing 1, and mounted on the bar 18, between the plates 14 and 15, is a sleeve 19, carrying an enlarged gear wheel 20, which meshes with the pinion 13. The inner side face of the gear wheel 20 is formed with a circular rack 21, which meshes with an actuating member 22 in the form of a pinion, for operating the gear 20. The actuating member 22 is carried by one end of an operating shaft 23, which is journaled in the inner wall or side of the casing 1, and said shaft 23 is of a length to extend into the motor vehicle so that it can be conveniently grasped and operated by the driver. The shaft 23 carries a handle 24.

When the shaft 23 is operated in a clockwise direction the gear 20 is revolved, causing the operation of the pinion 13, whereby the support 7 will be shifted to extended or open position, and when the shaft 23 is operated in an anti-clockwise direction the support is moved to closure position with respect to the open side of the casing 1.

Secured to the inner face of the support 7 is a base 25, carrying a signalling arm 26 in the form of an arrow. The arm 26 is hollow and has a lamp 27 positioned therein and connected to a socket 28, which is secured to the arm 26. Lenses 29, 30 are secured to the sides of the arm 26 and oppose the lamp 27. Circuit wire connections 31 lead to the lamp 27 and are carried by the support 7. The circuit wire connections 31 are attached to a circuit opening and closing member 32, which is pivotally connected, as at 33, to the support 7. The circuit opening and closing member 32 is curvilinear in contour and extends into the casing 1 and is adapted to engage a contact 34 supported within the casing 1 and which is carried by a support 35 of insulation and on which the member 32 rides after clearing the contact 34. Circuit connections 36 are attached to the contact 34 and which are arranged at one side of the path of travel of that end of the member 32 which engages the contact 34. The circuit opening and closing member 32 is employed for illuminating the lamp 27, at night, when the support 7 is extended to position the arm 26 in signalling position.

The arm 26 can be positioned at any desired angle with respect to the casing 1.

The cutaway portion 6 provides a clearance for the outer end of the arm 26 when the support 7 is shifted to and from extended position.

As the shaft 23 extends into the body of the vehicle, the indicator can be conveniently operated from the interior of a closed car or an open car when the curtains are up, and the indicator provides means whereby the driver of the vehicle can readily indicate to the driver of an on-coming vehicle or an approaching vehicle the direction of travel in which he contemplates going, and it is thought that the many advantages of a direction indicator for motor vehicles, in accordance with this invention, can be readily understood, and although the preferred embodiment of the invention is as illustrated and described, yet changes in the details of construction can be had which will fall within the scope of the invention as claimed.

What we claim is:—

A direction indicator comprising a support, a signalling means shiftable to and from signalling position with respect to one side of said support, a combined suspension and operating means for said signalling means extending transversely of said support, said combined suspension and operating means further forming a hinge between said signalling means and said support, a vertically disposed gear element arranged on an axis extending transversely of said support and operatively engaging with said operating means for actuating it to shift the signalling means to and from signalling position, said gear element provided concentrically on one side with a circular rack of less diameter than the gear element, and means revolvably mounted in and projecting outwardly from the other side of said support and disposed at right angles with respect to the axis of said gear element and engaging with the rack for revolving the gear element to actuate said operating means.

In testimony whereof, we affix our signatures hereto.

GOLDBURN C. RAY.
LOUIS W. TERRILL.